(12) United States Patent
Wang et al.

(10) Patent No.: US 12,441,764 B2
(45) Date of Patent: Oct. 14, 2025

(54) PHOSPHORYLATED ANTIGEN AND ANTIBODY AT SER23 SITE OF PGAM1 PROTEIN AS WELL AS PREPARATION METHODS AND APPLICATIONS

(71) Applicant: Tongji Hospital Affiliated with Tongji Medical College of Huazhong University of Science and Technology, Wuhan (CN)

(72) Inventors: Congyi Wang, Wuhan (CN); Chunliang Yang, Wuhan (CN); Shanjie Rong, Wuhan (CN); Fei Sun, Wuhan (CN); Jiahui Luo, Wuhan (CN); Shu Zhang, Wuhan (CN); Qilin Yu, Wuhan (CN)

(73) Assignee: Tongji Hospital Affiliated with Tongji Medical College of Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/982,853

(22) Filed: Dec. 16, 2024

(65) Prior Publication Data

US 2025/0277000 A1    Sep. 4, 2025

(30) Foreign Application Priority Data

Feb. 29, 2024  (CN) .......................... 202410226783.9

(51) Int. Cl.
  *A61K 39/395* (2006.01)
  *C07K 7/06* (2006.01)
  *C07K 16/40* (2006.01)

(52) U.S. Cl.
  CPC .......... *C07K 7/06* (2013.01); *A61K 39/39525* (2013.01); *A61K 39/3955* (2013.01); *C07K 16/40* (2013.01)

(58) Field of Classification Search
  CPC ......... A61K 39/395; C07K 16/40; C07K 7/06
  See application file for complete search history.

(56) References Cited

FOREIGN PATENT DOCUMENTS

| CN | 1727896 A | 2/2006 |
|---|---|---|
| CN | 1751128 A | 3/2006 |
| CN | 118240077 A | 6/2024 |

*Primary Examiner* — Xiaozhen Xie
(74) *Attorney, Agent, or Firm* — George D. Morgan

(57) ABSTRACT

The present application relates to the field of biotechnology, in particular to a phosphorylated antigen at a Ser23 site of a PGAM1 protein and a method for preparing an antibody directed to the phosphorylated antigen. The amino acid sequence of the phosphorylated polypeptide is as shown in SEQ ID NO.3, where a phosphorylation site of the phosphorylated polypeptide is serine.

3 Claims, 10 Drawing Sheets

Specification includes a Sequence Listing.

PHOSPHORYLATED ANTIGEN AND ANTIBODY AT SER23 SITE OF PGAM1 PROTEIN AS WELL AS PREPARATION METHODS AND APPLICATIONS

CROSS-REFERENCE TO RELATED APPLICATIONS

The application claims priority to Chinese patent application No. 2024102267839, filed on Feb. 29, 2024, the entire contents of which are incorporated herein by reference.

SEQUENCE LISTING

The sequence listing xml file submitted herewith, named "SEQUENCE_LISTING.xml", created on May 30, 2025, and having a file size of 8,192 bytes, is incorporated by reference herein.

TECHNICAL FIELD

The present application relates to the field of biotechnology, in particular to a phosphorylated antigen and antibody at a Ser23 site of a PGAM1 protein as well as preparation methods and applications thereof.

BACKGROUND

Phosphoglycerate mutase 1 (PGAM1) is an important functional enzyme that acts as a glycolytic pathway. Its main function is to catalyze the conversion of 3-phosphoglycerate (3-PG) into 2-phosphoglycerate (2-PG), so as to promote glucose metabolism and energy production, and to coordinate serine production and pentose phosphate pathways. PGAM1 is mainly expressed in the liver, kidneys, and brain. Moreover, it is abnormally expressed in a variety of human tumors such as breast cancer, colorectal cancer, lung cancer, prostate cancer, oral squamous cell carcinoma, and esophageal squamous cell carcinoma. This abnormal expression may promote the proliferation and metastasis of cancer cells, resulting in a poor prognosis.

Post-translational modifications such as phosphorylation, ubiquitination, and sumoylation play important roles in the regulation of physiological and pathological processes mediated by cell signaling pathways. PGAM1 plays an important role in aerobic glycolysis and cellular metabolic reprogramming. Therefore, it is of great significance to further research the post-translational modifications of the PGAM1 protein. Based on the previous research, it was found that serine (Ser23) at a $23^{rd}$ site in a PGAM1 amino acid sequence was the site of protein phosphorylation modification, which may play an important role in the regulation of the function of the PGAM1 protein and the transduction of upstream and downstream signals.

Antibody is an important tool for protein function research, which has been widely used in aspects such as the research on pathogenesis of autoimmune diseases, infectious diseases and tumors, disease diagnosis, and clinical treatment. However, at present, there is no specific phosphorylated PGAM1 S23 antibody available, which seriously hinders the analysis of the functions of the PGAM1 protein and the research on related molecular mechanisms. The specificity of the antibody mainly depends on antigens. Therefore, the question is that how to provide a specific phosphorylated antigen at a Ser23 site of a PGAM1 protein.

SUMMARY

The present application provides a phosphorylated antigen and antibody at a Ser23 site of a PGAM1 protein as well as preparation methods and applications thereof, so as to fill in the gap in the prior art that there is no specific phosphorylated antigen at a Ser23 site of a PGAM1 protein at present.

In a first aspect, the present application provides a phosphorylated antigen at a Ser23 site of a PGAM1 protein. The phosphorylated antigen is a phosphorylated polypeptide, and an amino acid sequence of the phosphorylated polypeptide is as shown SEQ ID NO.3, where a phosphorylation site of the phosphorylated polypeptide is serine.

Optionally, the phosphorylation site of the phosphorylated polypeptide is a $23^{rd}$ site of the PGAM1 protein.

In a second aspect, the present application provides a method for preparing the phosphorylated antigen according to the first aspect, the method including:
with the $23^{rd}$ site of the PGAM1 protein as a base point, selecting a preset number of amino acid groups respectively along an upstream or downstream direction on an amino acid sequence of the PGAM1 protein as shown in SEQ ID NO.2 to obtain a plurality of sets of preset antigens;
analyzing and screening the plurality of sets of preset antigens by adopting an immune epitope database to obtain an optimal antigen;
phosphorylating the optimal antigen to obtain a phosphorylated polypeptide; and
carrying out protein coupling on the phosphorylated polypeptide to obtain the phosphorylated antigen,
where the preset number is 2 to 5.

In a fourth aspect, the present application provides an application of a phosphorylated antigen at a Ser23 site of a PGAM1 protein. The application includes: using the phosphorylated antigen according to the first aspect in the preparation of pharmaceuticals related to tumors, autoimmune diseases, and cardiovascular diseases, where the related pharmaceuticals include pharmaceutical preparations for diagnosis, treatment, and prognosis determination.

In a fifth aspect, the present application provides a phosphorylated antibody at a Ser23 site of a PGAM1 protein. The phosphorylated antibody is obtained by immunizing an animal body with the phosphorylated antigen according to the first aspect.

In a sixth aspect, the present application provides a method for preparing the phosphorylated antibody according to the fourth aspect, the method including:
immunizing an animal model to a preset antiserum titer by adopting the phosphorylated antigen according to the first aspect to obtain an antiserum sample;
synthesizing phosphorylated polypeptides: NRFS(p)GWY as shown in SEQ ID NO. 3 and non-phosphorylated polypeptides: NRFSGWY as shown in SEQ ID NO. 1 respectively according to the amino acid sequence of the PGAM1 protein as shown in SEQ ID NO.2, and then carrying out protein coupling to obtain a phosphorylated antigen and a non-phosphorylated antigen; and
purifying the antiserum sample by respectively adopting the phosphorylated antigen and the non-phosphorylated antigen to obtain the phosphorylated antibody.

Optionally, the preset antiserum titer is not less than 1:32000.

Optionally, the number of times of the immunization is not less than 4.

Optionally, the purifying the antiserum sample by respectively adopting the phosphorylated antigen and the non-phosphorylated antigen to obtain the phosphorylated antibody includes the steps:

carrying out primary affinity purification on the antiserum sample by adopting the phosphorylated antigen to obtain a crude phosphorylated antibody; and carrying out secondary affinity purification on the crude phosphorylated antibody by adopting the non-phosphorylated antigen to obtain the phosphorylated antibody.

In a seventh aspect, the present application provides an application of a phosphorylated antibody at a Ser23 site of a PGAM1 protein. The application includes: using the phosphorylated antibody according to the fifth aspect in the preparation of pharmaceuticals related to tumors, autoimmune diseases, and cardiovascular diseases, where the related pharmaceuticals include pharmaceutical preparations for diagnosis, treatment, and prognosis determination.

Compared with the prior art, the above technical solutions provided in the examples of the present application have the following advantages:

In the phosphorylated antigen at the Ser23 site of the PGAM1 protein provided in the examples of the present application, through the phosphorylation analysis of the amino acid sequence of the PGAM1 protein and in combination with the specificity analysis of the PGAM1 protein, it can be clearly determined that the $23^{rd}$ site of the PGAM1 protein is a key site for phosphorylation modifications. Meanwhile, this site may play an important role in the regulation of the function of the PGAM1 protein and the transduction of the upstream and downstream signals. Therefore, this site is specifically designed, so that a specific phosphorylated antigen of the PGAM1 protein may be obtained, and a specific amino acid sequence of the phosphorylated antigen is refined, so that the phosphorylated antibody with good specificity may be prepared through the phosphorylated antigen, which is helpful for researching the action mechanism of the phosphorylation modifications at specific sites of the PGAM1 protein in specific biological events or the occurrence and development process of diseases, may also provide potential targets for the diagnosis and treatment of clinical diseases, and may also improve the accuracy of detecting the phosphorylation level of the PGAM1 protein by using immunology-related experiments such as immunohistochemistry (IHC) and enzyme-linked immunosorbent assay (ELISA). Meanwhile, the phosphorylated antigen may also be used for discussing the relationship between the PGAM1 and diseases such as autoimmune diseases, infectious diseases, and tumors, and has a wide application prospect in the aspects of disease diagnosis, treatment, prognosis determination and so on. Therefore, the phosphorylated antigen provided by the present application fills in the gap in the prior art that there is no specific phosphorylated antigen at a Ser23 site of a PGAM1 protein at present.

BRIEF DESCRIPTION OF THE DRAWINGS

The accompanying drawings herein are incorporated into the specification and constitute a part of the specification, show the examples consistent with the present application, and are used for explaining the principle of the present application together with the specification.

To describe the technical solutions in the examples of the present application or in the prior art more clearly, the following briefly introduces the accompanying drawings required for describing the examples or the prior art. Apparently, a person of ordinary skill in the art may still derive other drawings from these accompanying drawings without creative efforts.

FIG. 7a is a graph showing mass spectrum detection results of a phosphorylated polypeptide, and FIG. 7b is a graph showing high performance liquid chromatography detection results of a phosphorylated polypeptide;

FIG. 8a is a graph showing mass spectrum detection results of a phosphorylated polypeptide, and FIG. 8b is a graph showing high performance liquid chromatography detection results of a phosphorylated polypeptide;

DETAILED DESCRIPTION OF THE EMBODIMENTS

To make the objectives, technical solutions, and advantages of the examples of the present application clearer, the following clearly and completely describes the technical solutions in the examples of the present application with reference to the accompanying drawings in the examples of the present application. Apparently, the described examples are some but not all of the examples of the present application. All other examples obtained by those of ordinary skill in the art based on the examples of the present application without creative efforts shall fall within the protection scope of the present application.

Unless otherwise specified, various raw materials, reagents, instruments, devices, etc. used in the present application can be purchased from the market or can be prepared by existing methods.

An example of the present application provides a phosphorylated antigen at a Ser23 site of a PGAM1 protein, the phosphorylated antigen being a phosphorylated polypeptide, and an amino acid sequence of the phosphorylated polypeptide being as shown in SEQ ID NO.3, where a phosphorylation site of the phosphorylated polypeptide is serine.

In some optional implementations, the phosphorylation site of the phosphorylated polypeptide is a $23^{rd}$ site of the PGAM1 protein.

In the examples of the present application, a key phosphorylation modification site in the PGAM1 protein may be determined by determining the specific phosphorylation site of the phosphorylated polypeptide. The $23^{rd}$ site of the PGAM1 protein may play an important role in the regulation of the function of the PGAM1 protein and the transduction of upstream and downstream signals, and therefore, this site is specifically designed, so that a specific antigen of the PGAM1 protein may be clearly obtained, laying the foundation for obtaining the specific antibody of the PGAM1 protein subsequently.

It should be noted that the genetic sequence of the PGAM1 protein may be Gene ID:5223.

It should be noted that the amino acid sequence of the PGAM1 protein may be the amino acid sequence as shown in SEQ ID NO.2.

Figure 1:
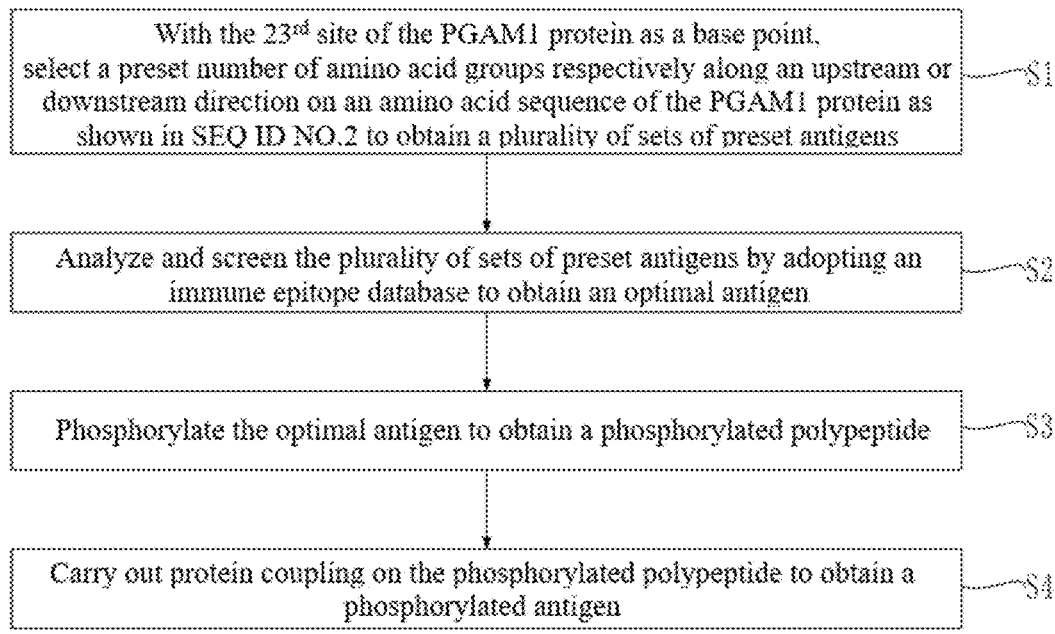
FIG. 1 is a detailed flow diagram of a method for preparing a phosphorylated antigen at a Ser23 site of a PGAM1 protein provided in examples of the present application.

FIG. 1 exemplarily shows a detailed flow diagram of a method for preparing a phosphorylated antigen at a Ser23 site of a PGAM1 protein provided by an example of the present application;

As shown in FIG. 1, based on a general inventive concept, an example of the present application provides a method for preparing the phosphorylated antigen, the method including:
  S1, with the $23^{rd}$ site of the PGAM1 protein as a base point, selecting a preset number of amino acid groups respectively along an upstream or downstream direction on an amino acid sequence of the PGAM1 protein as shown in SEQ ID NO.2 to obtain a plurality of sets of preset antigens;
  S2, analyzing and screening the plurality of sets of preset antigens by adopting an immune epitope database to obtain an optimal antigen;
  S3, phosphorylating the optimal antigen to obtain a phosphorylated polypeptide; and
  S4, carrying out protein coupling on the phosphorylated polypeptide to obtain the phosphorylated antigen, where the preset number is 2 to 5.

In the examples of the present application, refining the phosphorylation modification and the protein coupling includes the specific steps: firstly, selecting and combining a plurality of amino acid groups with the $23^{rd}$ site of the PGAM1 protein as a base point so as to design a plurality of sets of preset antigens, then analyzing and screening the preset antigens by an immune epitope database to obtain an optimal antigen with optimal data, and finally, carrying out phosphorylation and protein coupling on the optimal antigen to obtain the phosphorylated antigen.

The preset number may be 2, 3, 4, or 5.

Based on a general inventive concept, an example of the present application provides an application of a phosphorylated antigen at a Ser23 site of a PGAM1 protein. The application includes: using the phosphorylated antigen in the preparation of pharmaceuticals related to tumors, autoimmune diseases, and cardiovascular diseases, where the related pharmaceuticals include pharmaceutical preparations for diagnosis, treatment, and prognosis determination.

The application is implemented based on the above phosphorylated antigen, and the specific steps of the phosphorylated antigen may refer to the above examples. Since the application adopts part or all of the technical solutions of the above examples, it at least has all the beneficial effects brought by the technical solutions of the above examples, which will not be described here again.

Based on a general inventive concept, an example of the present application provides a phosphorylated antibody at a Ser23 site of a PGAM1 protein. The phosphorylated antibody is obtained by immunizing an animal body with the phosphorylated antigen.

The phosphorylated antibody is implemented based on the above phosphorylated antigen, and the specific steps of the phosphorylated antigen may refer to the above examples. Since the phosphorylated antibody adopts part or all of the technical solutions of the above examples, it at least has all the beneficial effects brought by the technical solutions of the above examples, which will not be described here again.

Figure 2:
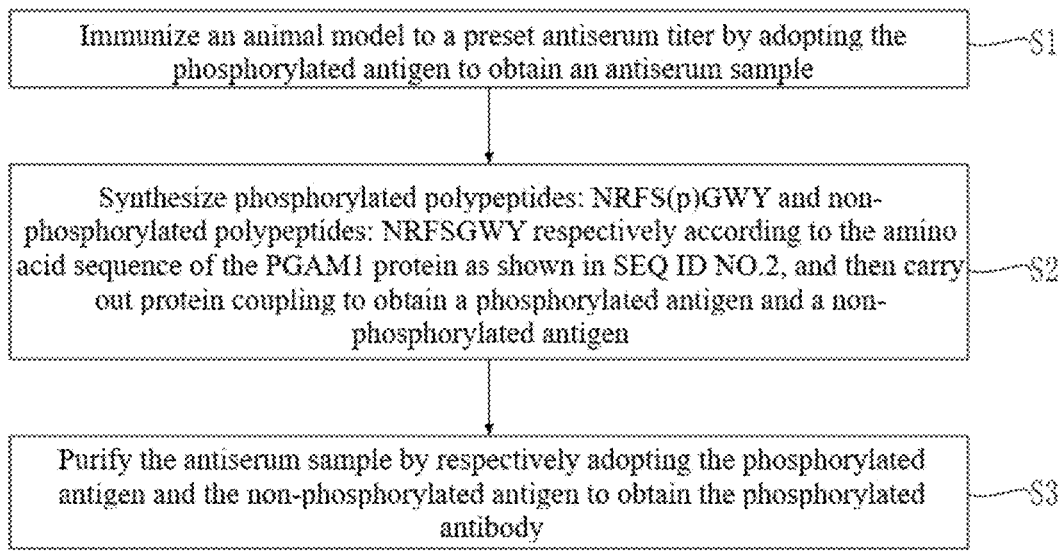
FIG. 2 is a flow diagram of a method for preparing a phosphorylated antibody at a Ser23 site of a PGAM1 protein provided in examples of the present application.

FIG. 2 exemplarily shows a flow diagram of a method for preparing a phosphorylated antibody at a Ser23 site of a PGAM1 protein provided by an example of the present application;

As shown in FIG. 2, based on a general inventive concept, an example of the present application provides a method for preparing the phosphorylated antibody, the method including:
  S1, immunizing an animal model to a preset antiserum titer by adopting the phosphorylated antigen to obtain an antiserum sample;
  S2, synthesizing phosphorylated polypeptides: NRFS(p)GWY as shown in SEQ ID NO. 3 and non-phosphorylated polypeptides: NRFSGWY as shown in SEQ ID NO. 1 respectively according to the amino acid sequence of the PGAM1 protein as shown in SEQ ID NO.2, and then carrying out protein coupling to obtain a phosphorylated antigen and a non-phosphorylated antigen; and
  S3, purifying the antiserum sample by respectively adopting the phosphorylated antigen and the non-phosphorylated antigen to obtain the phosphorylated antibody.

The preparation method is the above method for preparing the phosphorylated antibody. The specific composition of the phosphorylated antibody may refer to the above examples. Since the method adopts part or all of the technical solutions of the above examples, it at least has all the beneficial effects brought by the technical solutions of the above examples, which will not be described here again.

It should be noted that the preset antiserum titer may be detected by an indirect ELISA method.

It should be noted that the purification may be carried out by adopting an antigen-antibody affinity purification method.

In some optional implementations, the preset antiserum titer is not less than 1:32000.

In some optimal implementations, the number of times of the immunization is not less than 4.

In the examples of the present application, the specific number of times of the immunization and the specific preset antiserum titer are controlled, so that the antiserum titer in an animal model may reach more than 1:32000 through multiple times of immunization, and thus it can be determined that the phosphorylated antibody has good specificity.

Figure 3:
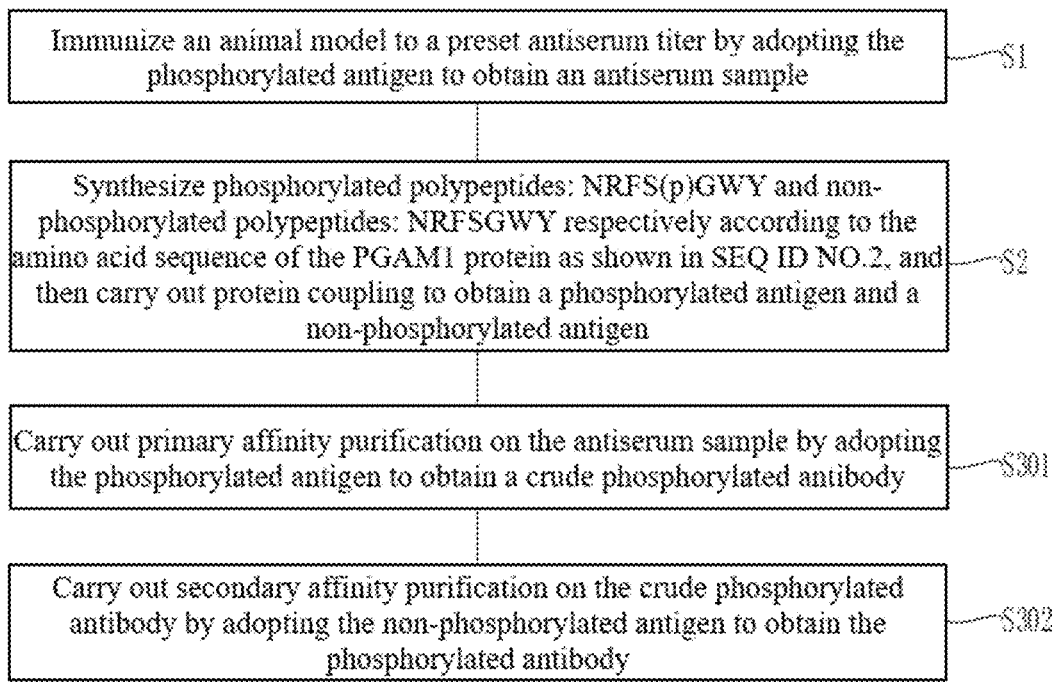
FIG. 3 is a detailed flow diagram of a method for preparing a phosphorylated antibody at a Ser23 site of a PGAM1 protein provided in examples of the present application.

FIG. 3 exemplarily shows a detailed flow diagram of a method for preparing a phosphorylated antibody at a Ser23 site of a PGAM1 protein provided by an example of the present application.

As shown in FIG. 3, in some optional implementations, the purifying the antiserum sample by respectively adopting the phosphorylated antigen and the non-phosphorylated antigen to obtain the phosphorylated antibody includes the steps:

S301. carrying out primary affinity purification on the antiserum sample by adopting the phosphorylated antigen to obtain a crude phosphorylated antibody; and S302, carrying out secondary affinity purification on the crude phosphorylated antibody by adopting the non-phosphorylated antigen to obtain the phosphorylated antibody.

In the examples of the present application, by refining the specific steps of the purification, the non-phosphorylated antigen and the phosphorylated antigen are used to sequentially carry out multiple affinity purifications on the antiserum sample, so that the preliminary purification of the antiserum sample may be achieved through the non-phosphorylated antigen, and then the phosphorylated antigen is used to further purify the antiserum sample, so that the specific antibody may be obtained.

Based on a general inventive concept, an example of the present application provide an application of a phosphorylated antibody at a Ser23 site of a PGAM1 protein. The application includes: using the phosphorylated antibody in the preparation of pharmaceuticals related to tumors, autoimmune diseases, and cardiovascular diseases, where the related pharmaceuticals include pharmaceutical preparations for diagnosis, treatment, and prognosis determination.

The present application will be further illustrated below in conjunction with specific examples. It shall be understood that, these examples are used for illustrative purposes only, not limitative to the scope of the present application. In the examples below, measurements in the experimental methods with specific conditions unspecified are typically measured in accordance with industrial standards. In case of absence of the respective industrial standards, measurement is performed in accordance with general international standards and general conditions or in accordance with conditions suggested by manufacturers.

Example 1

Figure 4:
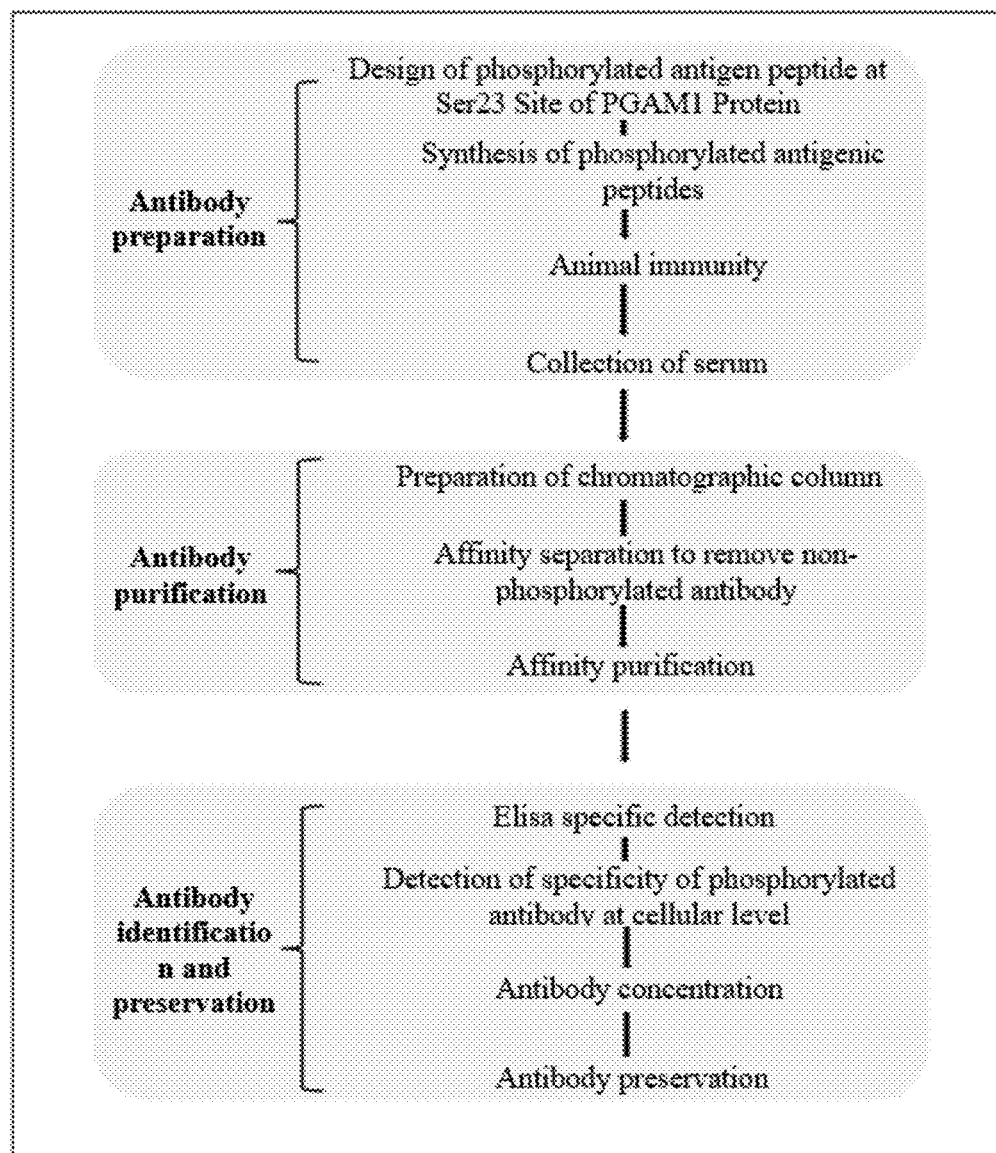
FIG. 4 is an actual flow diagram of a method for preparing a phosphorylated antibody at a Ser23 site of a PGAM1 protein provided in examples of the present application.

FIG. 4 exemplarily shows an actual flow diagram of a method for preparing a phosphorylated antibody at a Ser23 site of a PGAM1 protein provided according to an example of the present application.

As shown in FIG. 4, I, preparation of a phosphorylated antigen peptide at the Ser23 site of the PGAM1 protein includes the specific steps:

1. Firstly, the amino acid sequence of PGAM1 was obtained by querying an NCBI database, as shown in SEQ ID NO.2.

(SEQ ID NO. 2)
MAAYKLVLIRHGESAWNLENRFSGWYDADLSPAGHEEAKRGGQALRD

AGYEFDICFTSVQKRAIRTLWTVLDAIDQMWLPVVRTWRLNERHYGGLI

GLNKAETAAKHGEAQVKIWRRSYDVPPPPMEPDHPFYSNISKDRRYADL

TEDQLPSCESLKDTIARALPFWNEEIVPQIKEGKRVLIAAHGNSLRGIV

KHLEGLSEEAIMELNLPTGIPIVYELDKNLKPIKPMQFLGDEETVRKAM

EAVAAQGKAKK.

The Ser23 site of the PGAM1 protein was taken as a center, N-terminus were adjacent to three amino acid sequences of PGAM1, C-terminus were connected to the three amino acid sequences to obtain an optimal antigen as shown in SEQ ID NO.1, and then the optimal antigen was phosphorylated to obtain a phosphorylated polypeptide sequence: NRFS(p)GWY as shown in SEQ ID NO. 3.

Figure 5:
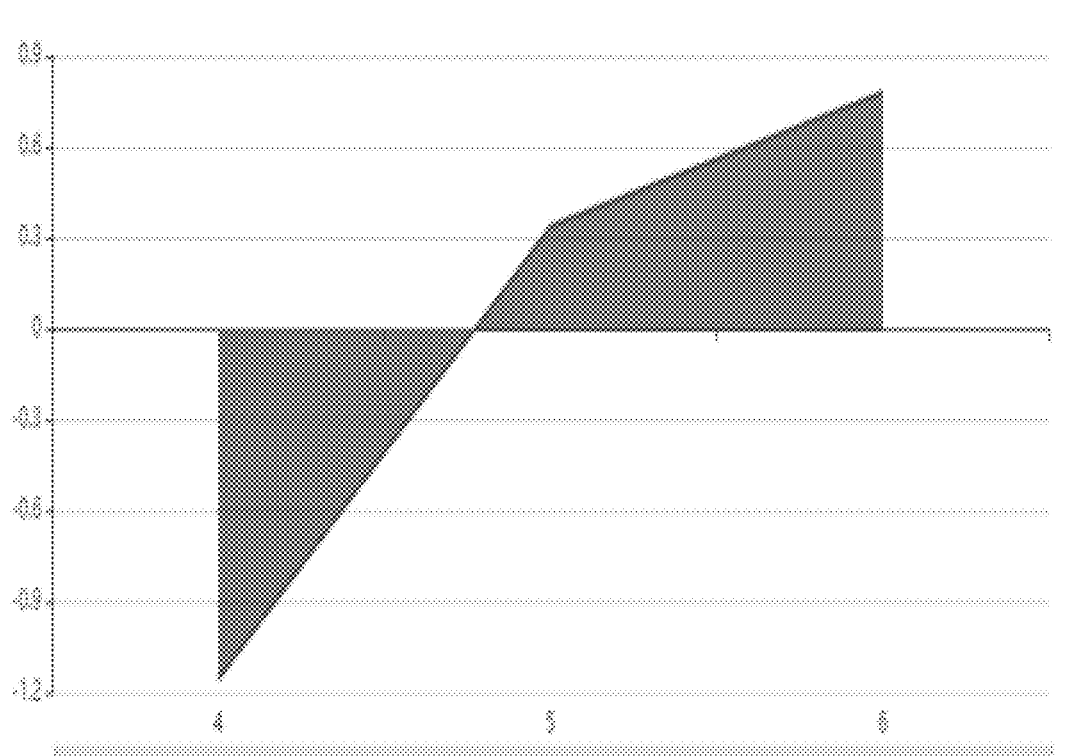
FIG. 5 is a graph showing immunogenicity evaluation results of a phosphorylated polypeptide provided in Example 1 of the present application.
Figure 6:
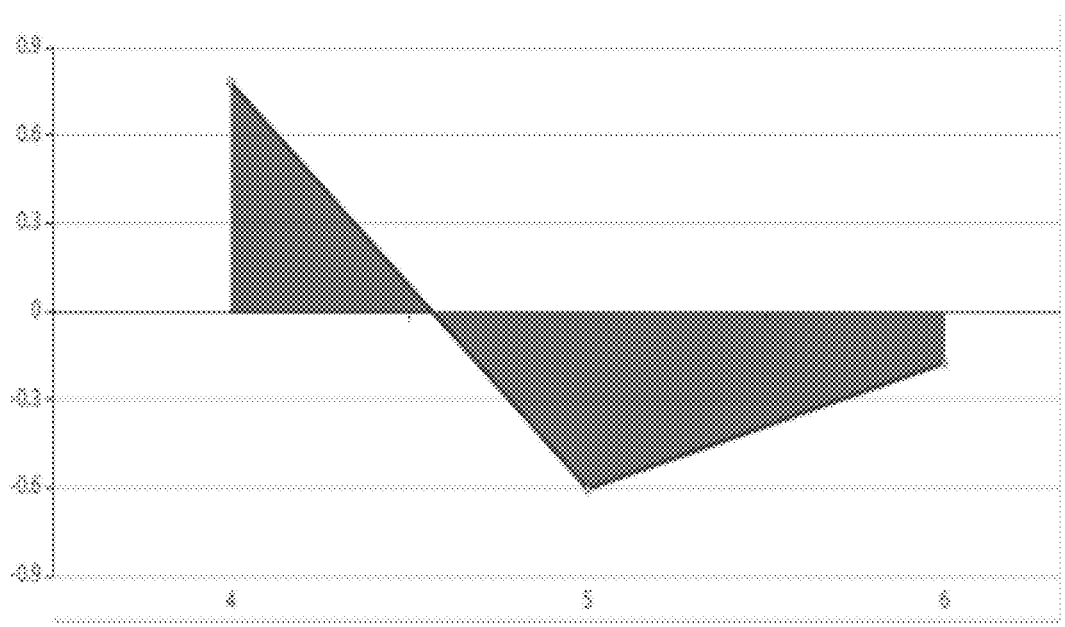
FIG. 6 is a graph showing hydrophilicity evaluation results of an amino acid sequence of a phosphorylated polypeptide provided in Example 1 of the present application.

2. The immunogenicity and hydrophilicity of the antigen peptide sequence NRFS(p)GWY as shown in SEQ ID NO. 3 were evaluated using the immune epitope database (IEDB). The results are shown in FIG. 5 and FIG. 6, and are good, indicating that NRFS(p)GWY as shown in SEQ ID NO. 3 has the potential to develop antigen peptides.

Figure 7:
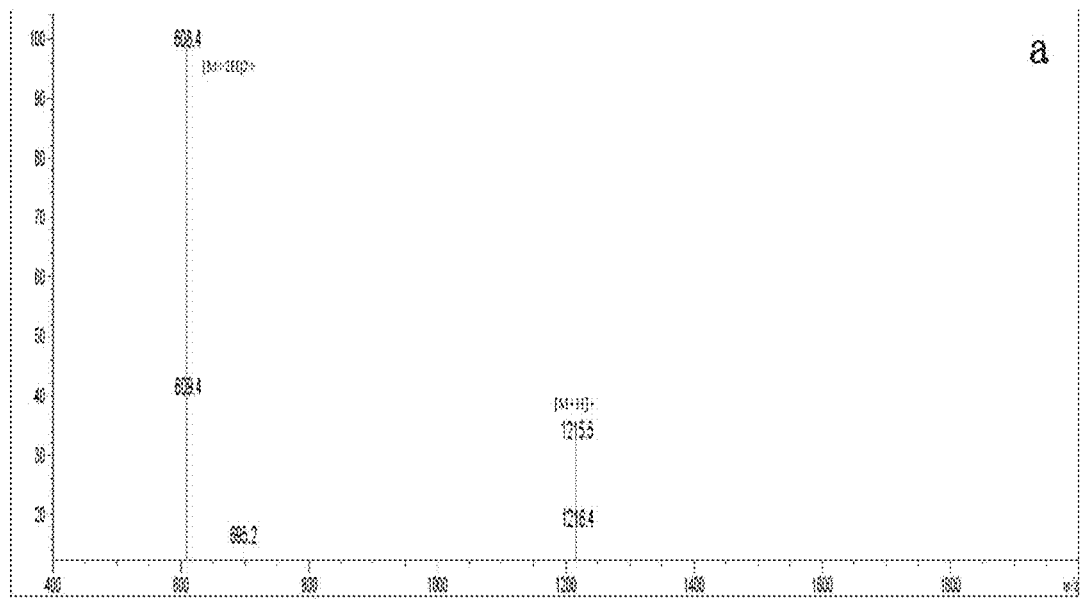
FIG. 7 is a graph showing mass spectrum detection and high performance liquid chromatography detection results of a phosphorylated polypeptide provided in Example 1 of the present application, where
Figure 7:
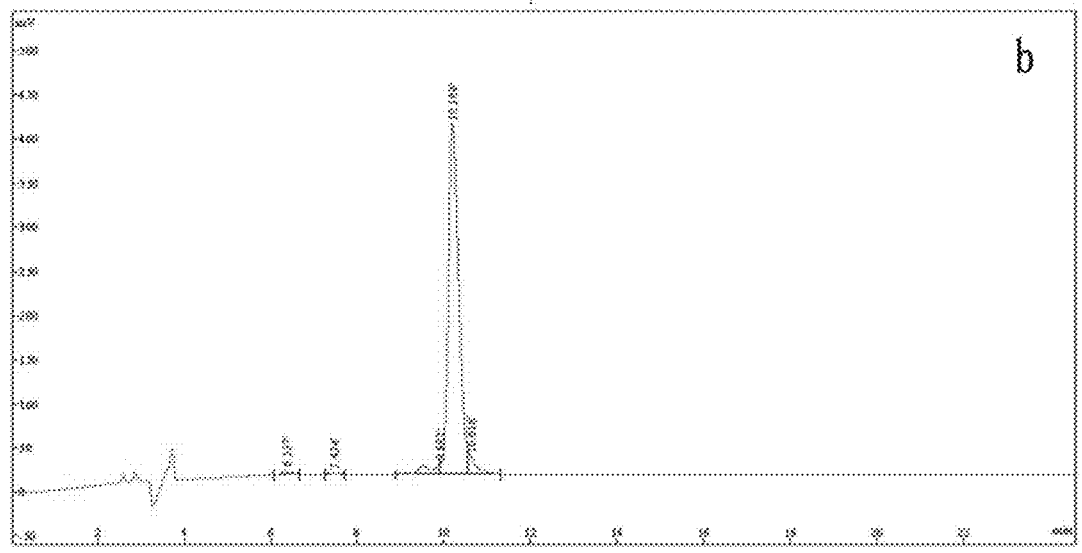

3. According to the design of the hapten synthetic peptide, a phosphorylated group was added to the Ser23 site to obtain the phosphorylated antigen (phosphorylated polypeptide), and then the quality of the synthesized phosphorylated polypeptide was detected by HPLC and MASS, as shown in FIG. 7, indicating that the sequence of the synthesized phosphorylated polypeptide was correct, the purity was greater than 90%, and the total amount met the requirements. Then, the phosphorylated polypeptide was coupled to hemocyanin (KLH) to obtain a complete antigen, and the complete antigen was then used to immunize rabbits (pSer23-KLH).

Figure 8:
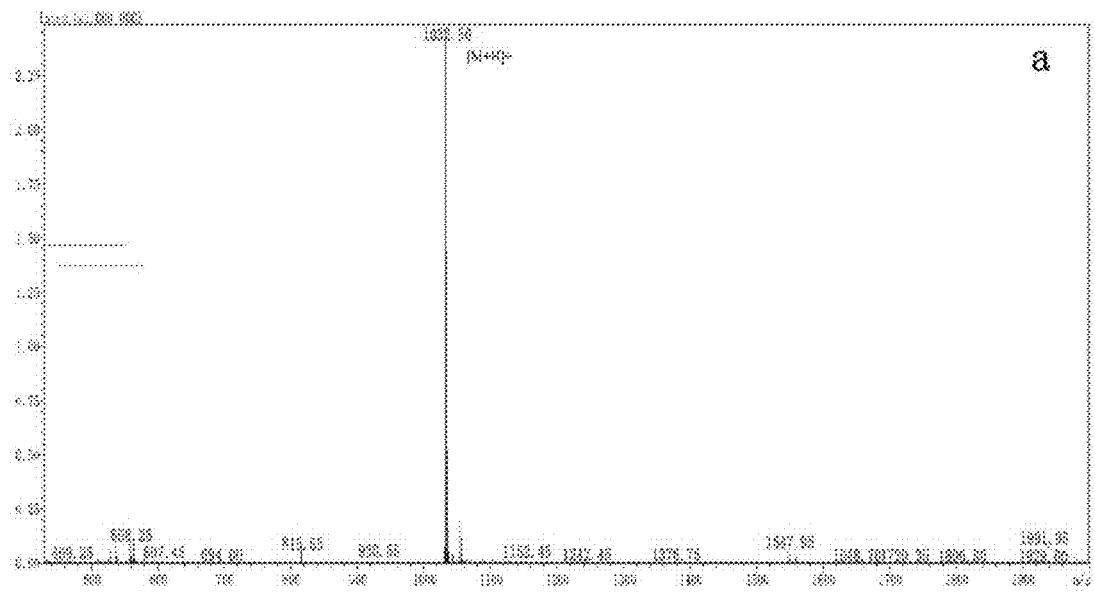
FIG. 8 is a graph showing mass spectrum detection and high performance liquid chromatography detection results of a non-phosphorylated polypeptide provided in Example 1 of the present application, where
Figure 8:
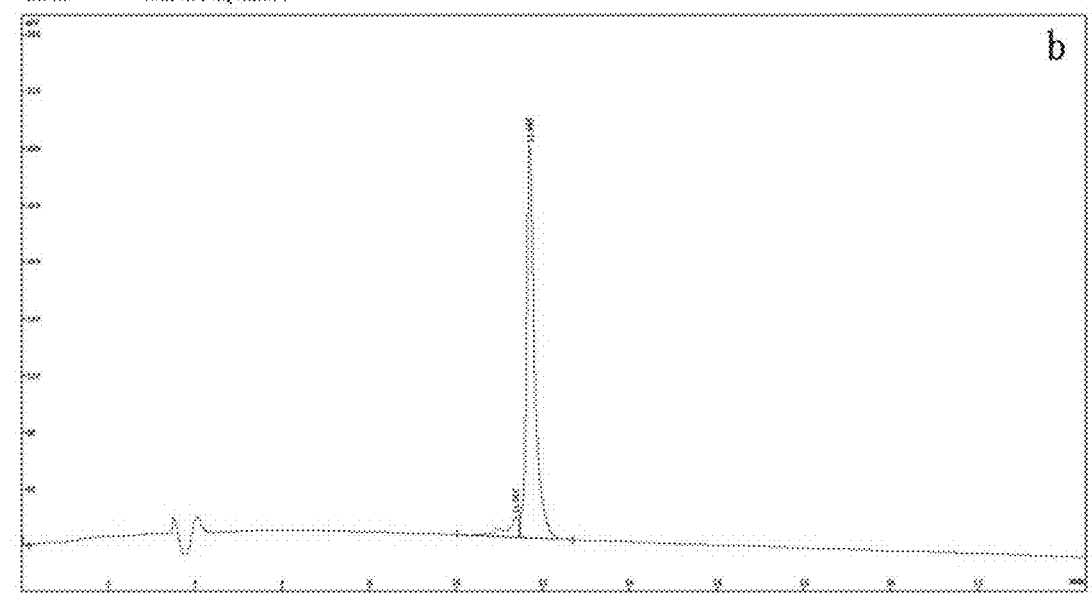

Correspondingly, a non-phosphorylated polypeptide sequence: NRFSGWY as shown in SEQ ID NO. 1 corresponding to Ser23 was synthesized according to the amino acid sequence as shown in SEQ ID NO.1, and then the quality of the synthesized peptide fragment was detected by HPLC and MASS, as shown in FIG. 8, indicating that the synthesized non-phosphorylated polypeptide sequence was correct, the purity was greater than 90%, and the total amount met the requirements; and each polypeptide was subpackaged and preserved in a refrigerator at −80° C. for subsequent purification steps of the antibody.

Example 2

II. Preparation of Antiserum by Immunizing Rabbits with the Complete Antigen pSer23-KLH at Multiple Sites 1. Preparation of Negative Serum:

Healthy female New Zealand white rabbits, 4 months old, with an average body weight of 2.1 kg were selected in an experiment, and injected at multiple sites on the back. 3 mL of blood was sampled from an ear vein of the New Zealand white rabbit used for injection into a blood collection tube, and the ear vein was pressed with a cotton ball to stop bleeding; and then the blood was placed at room temperature for about 1 h until the blood coagulated to form a blood clot, the blood clot was placed at 4° C. for 2 h to separate out the serum, the serum was centrifuged at 3,000 rpm for 15 min, the supernatant was sucked and labeled as negative control serum, and the negative control serum was subpackaged and stored at −80° C. for testing.

2. Animal Immunization (Total Time about 49 Days):

(1) pSer23-KLH antigen polypeptide powder was dissolved with sterile 1×PBS, an antigen solution was sucked with a sterile syringe, the same amount of Freund's complete adjuvant (CFA) was sucked with another syringe, the two were connected by means of a plastic tube, to-and-fro repeated sucking was carried out, the pSer23-KLH peptide fragment was mixed with the CFA uniformly until a completely emulsified emulsion was formed, and the emulsion drips into water without diffusion (the Freund's complete adjuvant was used for the first main injection, and Freund's incomplete adjuvant was used for the subsequent booster injection, which were fully mixed with the same volume of antigen before injection);

(2) in the first immunization, multi-part and multi-site injection of the antigen emulsion was carried out, for example, the antigen emulsion was injected subcutaneously at two sides of parts of the neck and back (where the skin is thin and loose), injected intramuscularly at both sides of the gluteus and thighs, injected intradermally at both sides of the waist, and injected into the paw pads of the rabbits. The injection amount for the main injection for the first time was 1.6 mg of antigen polypeptide per experimental rabbit;

(3) the second booster immunization was carried out on the $14^{th}$ days after the first immunization. The antigen emulsion was prepared with Freund's incomplete adjuvant (IFA) instead of the CFA as the immune adjuvant and injected according to the first immunization. 0.8 mg of antigen polypeptide per experimental rabbit was subjected to booster injection;

(4) the third booster immunization was carried out on the $28^{th}$ days after the first immunization. The antigen emulsion was prepared with Freund's incomplete adjuvant (IFA) instead of the CFA as the immune adjuvant and injected according to the first immunization. The total amount of antigen in this booster immunization was about 0.8 mg;

(5) blood collection after the third booster immunization: On the $29^{th}$ day, 1 mL of blood was collected from the ear vein, and the blood was placed at room temperature for about 1 h. When the blood coagulated to form a blood clot, the blood clot was placed at 4° C. for 2 h to separate out the serum, the serum was centrifuged at 3,000 rpm for 15 min, the supernatant was sucked, and the titer of the antiserum was detected by ELISA;

(6) the fourth booster immunization was carried out on the $42^{nd}$ day after the first immunization, and the antigen used for immunization was Freund's incomplete adjuvant+pSer23-KLH antigen polypeptide; and after the fourth booster immunization, the Elisa detection was carried out, and if the titer reached more than 256 K, the rabbits were finally bloodletted, and if the titer did not reach 256 K, the rabbits were immunized for 6 to 7 injections; and (7) final bloodletting: on the $49^{th}$ day, the titer of antiserum detected by ELISA met the requirements, and the whole blood was collected from the carotid artery. A blood collection beaker was sealed and then left at room temperature overnight to allow the blood clot to contract. In the aseptic operation of the next day, the precipitated serum was subpackaged into a 50 mL centrifuge tube for centrifuging at 3,000 rpm for 15 min. The supernatant was taken, subpackaged into 1 mL/tube, labeled as the antiserum after immunization (about 51 mL in total), and stored at −80° C.

Example 3

3. Preparation of Affinity Purified Antibody Through Purification of Antiserum and ELISA Titer Detection (1) The phosphorylated antigen polypeptide pSer23 and the non-phosphorylated antigen polypeptide Ser23 prepared in Example 1 were coupled respectively with bovine serum albumin (BSA) by a glutaraldehyde method to be used as fillers pSer23-BSA and Ser23-BSA of an affinity purified chromatographic column.

(2) Preparation of phosphorylated synthetic peptide chromatographic column and non-phosphorylated synthetic peptide chromatographic column: pSer23-BSA and Ser23-BSA were respectively dissolved in a coupling buffer solution at a concentration of 0.7 mg/mL. 7 mg of pSer23-BSA and Ser23-BSA solution were taken respectively to be added to 5 mL of resin to be uniformly mixed, then the mixture was added to the chromatographic column for uniformly mixing at room temperature for 15 min, the chromatographic column was placed upright at room temperature for 30 min, caps at the upper and lower ends of the chromatographic column were taken down respectively, the liquid flowing out was collected, and the column was washed with the coupling buffer solution of 3 times the volume of the resin. A cap at a bottom end of the chromatographic column was covered, 50 mM L-Cysteine HCl was added to the coupling buffer solution for uniformly mixing, the same volume of buffer solution was taken to the chromatographic column for uniformly mixing at room temperature for 15 min, after standing for 30 min, the cap at the bottom end was taken down, the coupling buffer solution was released, the chromatographic column was cleaned with 6 volumes of 1 M NaCl, the chromatographic column was washed with 2 volumes of a storage buffer solution, the cap was covered, 1 volume of a storage buffer solution was added, and serum was stored at 4° C. for later use.

(3) 10 mL of antiserum was incubated with an affinity purification column overnight. Pre-washing was carried out with HCl at pH of 5.0 to remove miscellaneous antibodies. Subsequently, eluting was carried out with 0.15 Mg of a lycine buffer solution (pH 2.5), and quick neutralization was carried out with a 10×PBS buffer solution to prepare the affinity purified antibody.

(4) An affinity purified antibody passed through a non-phosphorylation affinity adsorption column to remove the antibody aim at the non-phosphorylated polypeptide to obtain a phosphorylation site specific antibody.

The concentration of the purified antibody was detected by the Bradford method, and the results are shown in Table 1.

TABLE 1

Concentration of each purified antibody

| Item | Concentration (ng/ml) | Volume (ml) | Mass (Mg) |
|---|---|---|---|
| M21129-A (De-unmodified) | 0.417 | 6 | 2.502 |
| M21130-B (De-unmodified) | 0.292 | 6 | 1.752 |
| M21131-C (De-unmodified) | 0.313 | 6 | 1.878 |
| M21132-D (De-unmodified) | 0.298 | 6 | 1.788 |

As can be seen from Table 1, that yield of the affinity purified antibody was normal.

Figure 9:
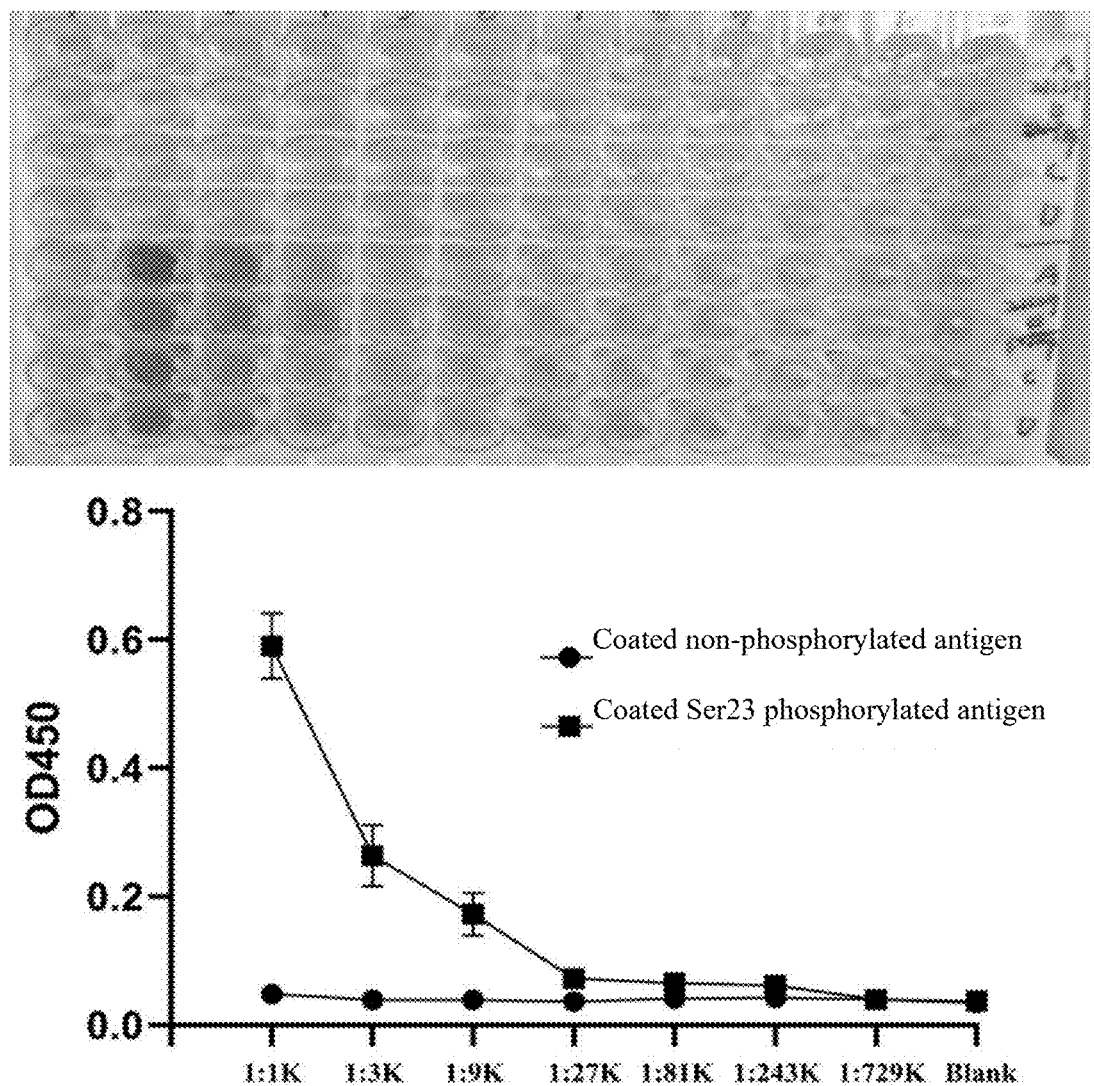
FIG. 9 is a graph showing ELISA detection results of a purified PGAM1 S23 phosphorylated antibody against phosphorylated polypeptide antigens and non-phosphorylated polypeptide antigens provided in Example 3 of the present application.

4. ELISA Titer Detection of Affinity Purified Antibody:

(1) antigen coating: a phosphorylated antigen peptide pSer23 and a non-phosphorylated antigen peptide Ser23 was diluted into 6 µg/mL of a solution with 0.05 mol/L carbonate (pH=9.6), and 100 µL of the solution was added in each well, and incubated at 4° C. overnight;

(2) plate washing: a plate was taken out and washed with 0.05% Tween-20 (PBST) for three times, with each wash lasting for 3 min;

(3) sealing: a 150 µl of sealing solution containing 5% of skim milk powder (PBST) was added into each well for sealing at 37° C. for 60 min;

(4) plate washing: the plate was taken out and washed with 0.05% Tween-20 (PBST) for three times, with each wash lasting for 3 min;
(5) primary antibody adding: the affinity purified antibody was diluted at a ratio of 1:1000, then diluted at a proportional ratio, and incubated at 37° C. for 1 h;
(6) plate washing: the plate was taken out and washed with 0.05% Tween-20 (PBST) for three times, with each wash lasting for 3 min;
(7) secondary antibody adding: horseradish enzyme-labeled goat anti-rabbit IgG (H+L), with a product No.: 116154 and an antibody company: Jackson, was diluted at a volume ratio of 1:8000 and incubated at 37° C. for 45 min;
(8) plate washing: the plate was taken out and washed with 0.05% Tween-20 (PBST) for five times, with each wash lasting for 3 min;
(9) color development: a 100 μL of substrate solution (TMB) was added in each well for reaction for 5 min to 10 min, and finally a 100 μL of 2 mol/L of sulfuric acid was added to terminate the reaction; and
(10) measurement of OD value: the OD value was measured at a wavelength of 450 nm with a microplate reader, and the results are shown in Table 2 and FIG. 9.

TABLE 2

ELISA titer test results of affinity purified antibody

| | BLANK | 1K | 3K | 9K | 27K | 81K | 243K | 729K |
|---|---|---|---|---|---|---|---|---|
| M21129-A (Unmodified) | 0.035 | 0.044 | 0.042 | 0.04 | 0.041 | 0.04 | 0.033 | 0.039 |
| M21129-B (Unmodified) | 0.037 | 0.036 | 0.036 | 0.04 | 0.04 | 0.042 | 0.04 | 0.04 |
| M21129-C (Unmodified) | 0.032 | 0.071 | 0.04 | 0.038 | 0.027 | 0.044 | 0.039 | 0.038 |
| M21129-D (Unmodified) | 0.033 | 0.043 | 0.038 | 0.037 | 0.037 | 0.037 | 0.058 | 0.043 |
| M21129-A (Phosphorylation modification) | 0.036 | 0.976 | 0.361 | 0.167 | 0.082 | 0.061 | 0.04 | 0.034 |
| M21130-B (Phosphorylation modification) | 0.036 | 0.478 | 0.326 | 0.244 | 0.077 | 0.096 | 0.066 | 0.04 |
| M21131-C (Phosphorylation modification) | 0.038 | 0.534 | 0.201 | 0.194 | 0.067 | 0.053 | 0.058 | 0.042 |
| M21132-D (Phosphorylation modification) | 0.039 | 0.41 | 0.167 | 0.085 | 0.062 | 0.051 | 0.082 | 0.042 |

Example 4

5. Application of the Phosphorylated Antibody at the Ser23 Site of the PGAM1 Protein in a Western Blot Experiment:

The high-specificity phosphorylated antibody at the Ser23 site of the PGAM1 protein prepared according to the present application may be used for detecting the phosphorylation level difference of cells by the Western blot experiment, and the specific steps are as follows:
(1) A phosphorylation-inactivated mutant plasmid PGAM1 S23-mut and a phosphorylation-activated mutant plasmid PGAM1 S23-TG at the PGAM1 Ser23 site were transfected into 293T cells; and after 48 hours, the cellular proteins were extracted, RIPA lysis buffer was used to lyse the cells at 4° C., the cell lysate was centrifuged at 12,000 rpm for 20 min at 4° C., the supernatant was transferred to a new EP tube, 5×SDS loading buffer was added, and boiling was carried out at 100° C. for 10 min. In order to prevent protein degradation, the operation was carried out on ice as much as possible.
(2) SDS-PAGE electrophoresis (polyacrylamide gel electrophoresis): glass plates filled with polyacrylamide gel were clipped as required, the prepared SDS polyacrylamide separation gel with a concentration of 12% was quickly added into the gap between the glass plates to ⅔ of the glass plates, and sealing was carried out with isopropanol. After the separation gel was solidified, the isopropano was poured out, and the residual liquid was sucked out by filter paper. Prepared stacking gel with a mass concentration of 5% was added to the separation gel, and a comb was inserted immediately. After the gel was completely solidified, the comb was pulled out and a sampling hole was washed with water. An electrophoresis device was fixed, a Tris-glycine electrophoresis buffer solution was added, and 20 μL of sample and pre-stained Marker were added in sequence. The electrophoresis device was connected to a power supply, a voltage was adjusted to 80 V, when bromophenol blue migrates to the separation gel, the voltage was adjusted to 110 V, and when the bromophenol blue migrates to the bottom of the separation gel, the power supply was turned off.
(3) Film transfer: the gel was taken down, the stacking gel and the redundant part were removed, and the gel was completely soaked in a newly prepared film transfer buffer solution; four pieces of filter paper and one PVDF film with the same sizes as the gel were cut, and one corner of the film was labeled with a pencil; the PVDF film was soaked in 100% methanol for about 1 min to be activated, and then the PVDF film was soaked in the film transfer buffer solution; a cathode plate of a transfer device was laid flat, a layer of sponge soaked in the film transfer buffer solution was placed, two layers of filter paper soaked in the film transfer buffer solution was placed on the sponge neatly, and a glass rod was used to drive out bubbles; with the black side of a film transfer clip facing down, the film transfer clip was immersed in the film transfer buffer solution, and the black sponge, the two layers of filter paper, the gel, the film (activated with methanol for 1 min in advance, label the front and back on the upper right corner, and reversely attach to the film), the two layers of filter paper and the black sponge were placed from bottom to top in order to ensure that there were no bubbles between the film and the gel, and the film was completely attached; and the gel was clipped with the film transfer clip. The fixed film transfer clip was placed into the film transfer tank, the film transfer tank was filled with the film transfer buffer solution, and finally the film transfer tank was placed into a foam box filled with ice, a constant current of 180 mA was set, and the film was transferred for 2.5 h (black to black, red to red, pay attention to the direction of the electrode).

(4) Sealing: the electrically transferred PVDF film was taken out, washed with TBST once, and sealed by a shaker at room temperature for 1 h using milk with a concentration of 5%.

(5) Primary antibody incubation: the phosphorylated antibody at the Ser23 site of the PGAM1 protein was diluted with a primary antibody diluent at a ratio of 1:1000; and the sealed PVDF film was taken out, rinsed with TBST for 2 min, and then incubated in a primary antibody at 4° C. overnight (16 h).

(6) Washing: the PVDF film was washed with TBST for 5 time, with 5 min each time;

(7) Secondary antibody incubation: the PVDF film was put into a secondary antibody (1:5000) labeled with horseradish peroxidase diluted using milk with a concentration of 5%, and incubated at room temperature for 1 h;

(8) Washing: the PVDF film was washed with TBST for 5 time, with 5 min each time;

(9) Development: an ECL AB solution was mixed at a volume ratio of 1:1 (0.5 mL each), and uniformly poured on the PVDF film, a developing cassette was wetted and dried with clean toilet paper, the film was spread in the cassette, and bubbles were removed; and after 5 min of development, the film was taken to a darkroom, a photographic film of the corresponding size was cut and stuck on the film, and the exposure time was determined according to the fluorescence intensity;

(10) Film development: after the exposure was completed, the film was placed in a developer for 1-3 min, rinsed with clean water, placed in a fixer for about 9 min, and finally baked in an oven, a target band was determined according to the marker and the results were analyzed.

Figure 10:
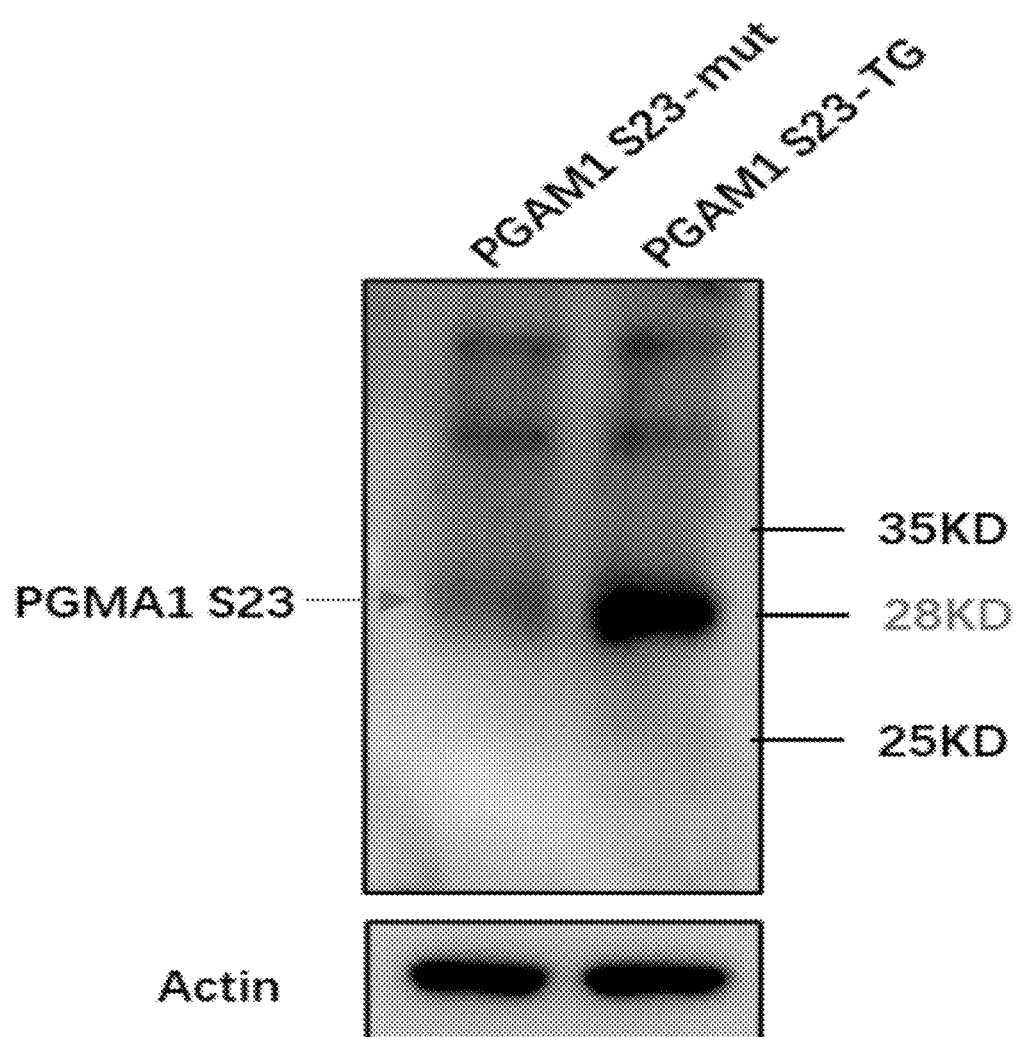
FIG. 10 is a graph showing results of verifying the specificity of a PGAM1 S23 phosphorylated antibody by Western blotting technology provided in Example 4 of the present application.

The test result is shown in FIG. 10, which indicates that in the immunoprecipitation product, the phosphorylated antibody at the Ser23 site (PGAM1 S23) can recognize the PGAM1 protein in the phosphorylation state at the Ser23 site, but cannot recognize the PGAM1 protein in the non-phosphorylation state at the Ser23 site, which proves that the specificity of the phosphorylated antibody is good.

To sum up, The phosphorylated antibody with good specificity may be prepared from the phosphorylated antigen at the Ser23 site of the PGAM1 protein provided in the examples of the present application, and therefore, the phosphorylated antigen provided by the present application fills in the gap in the prior art that there is no specific phosphorylated antigen at a Ser23 site of a PGAM1 protein at present.

Meanwhile, the phosphorylated antibody at the Ser23 site of the PGAM1 protein provided in the examples of the present application is convenient for researching the correlation of the phosphorylation modification of the specific site of the PGAM1 protein in specific biological events such as immune cell activation, cell metabolism reprogramming, and cell cycle in practical application.

Meanwhile, the phosphorylated antibody at the Ser23 site of the PGAM1 protein provided in the examples of the present application may also be used to research the polyclonal antibody phosphorylated at the Ser23 site of the PGAM1 protein, which is helpful for discussing various biological functions of the PGAM1 protein.

Moreover, the phosphorylated antibody at the Ser23 site of the PGAM1 protein provided in the examples of the present application is helpful for discussing the action mechanism of the phosphorylation modification of the PGAM1 protein in the occurrence and development processes of diseases such as autoimmune diseases, infectious diseases, and tumors, and may also be used for evaluating the change of tumor metabolic level under different treatment conditions, thereby providing a potential action target for the diagnosis and treatment of clinical tumor diseases.

Various examples of the present application may exist in a range; it should be understood that the description in a range is for convenience and brevity only and is not to be construed as a rigid limitation on the scope of the present application; and therefore, it should be considered that the description of the range has specifically disclosed all possible sub-ranges and single numerical values within the range. For example, it should be considered that the description of a range from 1 to 6 has specifically disclosed sub-ranges, such as from 1 to 3, from 1 to 4, from 1 to 5, from 2 to 4, from 2 to 6, from 3 to 6, etc., as well as individual numbers within the range, such as 1, 2, 3, 4, 5 and 6. This applies regardless of what the range is. Additionally, whenever a numerical range is stated herein, it is intended to include any recited number (fraction or integer) within the stated range.

In the present application, unless otherwise stated, the directional words such as "upper" and "lower" specifically refer to the directions on the drawings in the accompanying drawings. In addition, in the description of the specification of the present application, the terms "including", "comprising" and the like refer to "including but not limited to". As used herein, relational terms such as "first" and "second" are used merely to distinguish one entity or operation from another entity or operation and do not necessarily require or imply the existence of any such actual relationship or sequence between these entities or operations. As used herein, "and/or" describes an association relationship of associated objects and represents that there may be three relationships, for example, A and/or B may represent the cases: A exists individually, A and B exist simultaneously, and B exists individually. A and B may be singular or plural. As used herein, "at least one" refers to one or more; and "a plurality of" refers to two or more. "At least one", "at least one of the followings" or similar expressions refer to any combination of these items, including any combination of single or plural items. For example, "at least one of a, b, or c" or "at least one of a, b, and c" may each represent a, b, c, a-b (i.e., a and b), a-c, b-c, or a-b-c, where a, b, and c may each be a single or multiple.

The foregoing descriptions are merely specific implementations of the present application, so that those skilled in the art can understand or implement the present application. Various modifications to these examples will be readily apparent to those skilled in the art, and the general principles defined herein may be implemented in other examples without departing from the spirit or scope of the present application. Therefore, the present application will not be limited to these examples shown herein but is to be accorded the widest scope consistent with the principles and novel features applied herein.

SEQUENCE LISTING

```
Sequence total quantity: 3
SEQ ID NO: 1            moltype = AA   length = 7
FEATURE                 Location/Qualifiers
source                  1..7
                        mol_type = protein
                        organism = synthetic construct
SEQUENCE: 1
NRFSGWY                                                                    7

SEQ ID NO: 2            moltype = AA   length = 254
FEATURE                 Location/Qualifiers
source                  1..254
                        mol_type = protein
                        organism = synthetic construct
SEQUENCE: 2
MAAYKLVLIR HGESAWNLEN RFSGWYDADL SPAGHEEAKR GGQALRDAGY EFDICFTSVQ    60
KRAIRTLWTV LDAIDQMWLP VVRTWRLNER HYGGLTGLNK AETAAKHGEA QVKIWRRSYD   120
VPPPPMEPDH PFYSNISKDR RYADLTEDQL PSCESLKDTI ARALPFWNEE IVPQIKEGKR   180
VLIAAHGNSL RGIVKHLEGL SEEAIMELNL PTGIPIVYEL DKNLKPIKPM QFLGDEETVR   240
KAMEAVAAQG KAKK                                                     254

SEQ ID NO: 3            moltype = AA   length = 7
FEATURE                 Location/Qualifiers
source                  1..7
                        mol_type = protein
                        organism = synthetic construct
MOD_RES                 4
                        note = phosphoserine
SEQUENCE: 3
NRFSGWY                                                                    7
```

What is claimed is:

1. A method for preparing an antibody directed to a phosphorylated polypeptide, the method comprising:
   immunizing an animal model to an antiserum titer of at least 1:32000 by using a phosphorylated antigen to obtain an antiserum sample; wherein the phosphorylated antigen is a phosphorylated polypeptide, and an amino acid sequence of the phosphorylated polypeptide is as shown in SEQ ID NO.3, wherein a phosphorylation site of the phosphorylated polypeptide is serine; and the phosphorylation site of the phosphorylated polypeptide is $23^{rd}$ site of a phosphoglycerate mutase 1 (PGAM1) protein;
   synthesizing phosphorylated polypeptide: NRFS(p)GWY as shown in SEQ ID NO. 3 and non-phosphorylated polypeptide: NRFSGWY as shown in SEQ ID NO. 1 respectively according to the amino acid sequence of the PGAM1 protein as shown in SEQ ID NO.2, and then respectively coupling the phosphorylated polypeptide and the non-phosphorylated polypeptide to a carrier protein to obtain a phosphorylated antigen and a non-phosphorylated antigen; and
   purifying the antiserum sample by affinity chromatography using the phosphorylated antigen and the non-phosphorylated antigen to obtain the antibody.

2. The method according to claim 1, wherein the number of times of the immunization is not less than 4.

3. The method according to claim 1, wherein the purifying the antiserum sample by respectively adopting the phosphorylated antigen and the non-phosphorylated antigen respectively to obtain the antibody comprises the steps:
   carrying out primary affinity purification on the antiserum sample by adopting the phosphorylated antigen to obtain a crude antibody; and
   carrying out secondary affinity purification on the crude antibody by adopting the non-phosphorylated antigen to obtain the antibody.

* * * * *